United States Patent
Zeng et al.

(10) Patent No.: US 11,591,432 B2
(45) Date of Patent: Feb. 28, 2023

(54) AQUEOUS POLYMER DISPERSION AND PREPARATION METHOD THEREOF

(71) Applicant: BASF SE, Ludwigshafen am Rhein (DE)

(72) Inventors: Zhong Zeng, Shanghai (CN); Harm Wiese, Ludwigshafen (DE); Rui Deng, Shanghai (CN)

(73) Assignee: BASF SE, Ludwigshafen am Rhein (DE)

( * ) Notice: Subject to any disclaimer, the term of this patent is extended or adjusted under 35 U.S.C. 154(b) by 1074 days.

(21) Appl. No.: 16/305,502

(22) PCT Filed: May 24, 2017

(86) PCT No.: PCT/EP2017/062491
§ 371 (c)(1),
(2) Date: Nov. 29, 2018

(87) PCT Pub. No.: WO2017/207369
PCT Pub. Date: Dec. 7, 2017

(65) Prior Publication Data
US 2021/0155721 A1    May 27, 2021

(51) Int. Cl.
C09D 151/08 (2006.01)
C08F 283/12 (2006.01)
C08F 285/00 (2006.01)
C08F 2/22 (2006.01)
C08F 220/10 (2006.01)

(52) U.S. Cl.
CPC ............. C08F 285/00 (2013.01); C08F 2/22 (2013.01); C08F 220/10 (2013.01); C08F 283/12 (2013.01); C09D 151/085 (2013.01)

(58) Field of Classification Search
None
See application file for complete search history.

(56) References Cited

U.S. PATENT DOCUMENTS 6,147,142 A * 11/2000 Geck ................. C09D 7/65
                                                    525/902
2010/0086783 A1   4/2010 Schaefer et al.

FOREIGN PATENT DOCUMENTS

| CN | 101550217 A | 10/2009 |
|----|-------------|---------|
| CN | 101781390 A | 7/2010 |
| EP | 1 174 466 A1 | 1/2002 |
| JP | 62-127364 A | 6/1987 |
| JP | 2004-137374 A | 5/2004 |
| JP | 2008-12454 A | 1/2008 |

OTHER PUBLICATIONS

International Search Report dated Jul. 31, 2017 in PCT/EP2017/062491 filed May 24, 2017.
International Preliminary Report on Patentability and Written Opinion dated Dec. 4, 2018 in PCT/EP2017/062491 (English Translation only), 6 pages.
Kan, et al., "Study on the Preparation and Properties of Styrene—Butyl Acrylate—Silicone Copolymer Latices", Journal of Applied Polymer Science, vol. 82, Issue 13, Dec. 20, 2001, pp. 3194-3200.

* cited by examiner

*Primary Examiner* — David J Buttner
(74) *Attorney, Agent, or Firm* — Faegre, Drinker Biddle & Reath LLP

(57) ABSTRACT

The present invention relates to an aqueous polymer dispersion containing a multistage emulsion polymer particle. The multistage emulsion polymer particle contains a polysiloxane formed in the first stage; a transition layer formed in the second stage; and a polyacrylate formed in the third stage. The transition layer is made of silane coupling agents. The present invention also relates to a method of preparing the aqueous polymer dispersion and use of the aqueous polymer dispersion for preparing coatings.

18 Claims, 4 Drawing Sheets

AQUEOUS POLYMER DISPERSION AND PREPARATION METHOD THEREOF

TECHNICAL FIELD

The present invention relates to an aqueous polymer dispersion comprising a multistage emulsion polymer particle and a method of preparing the same. The present invention also relates to use of said aqueous polymer dispersion for preparing coatings.

BACKGROUND OF ART

Polyacrylates (PA) and polysiloxanes (PSi) each are widely used in various fields. However, due to poor compatibility between PA and PSi, it is difficult to balance the mechanical property, stability, and the water vapor permeability (WVP) of resulted coatings. For example, JP62127364A2 discloses a composite emulsion obtained by emulsifying silicone resin and acrylic resin simultaneously. Since the composite emulsion is obtained just by simply mixing silicone resin and acrylic resin in water, the properties of resulted film are not good.

Thus, various acrylate-siloxane copolymer dispersion is studied to obtain improved properties.

CN101781390B discloses a method of preparing silicone-polyacrylate emulsion having a core/shell structure, wherein the core is prepared from siloxane monomers and acrylate monomers, and the shell is prepared from acrylate monomers in the presence of silanes. According to this patent, exterior wall coatings formed from the silicone-polyacrylate emulsion have superior weather resistance and stain resistance over coatings formed from pure polyacrylate emulsion. Water-resistance of coating film is measured by dipping the coating film in water and as a result, the coating film becomes white after 120 h.

CN101550217A discloses a method of preparing soap-free silicone-polyacrylate emulsion having a core/shell structure, wherein the shell is prepared from siloxane monomers and silane coupling agents and the core is prepared from acrylate monomers. Water-resistance of coating film is measured by dipping the coating film in water and as a result, the coating film becomes white after 7 days.

JP2008012454A discloses a core/shell emulsion comprising an outer layer of acrylate-silicone copolymer and an inner layer of polyacrylate. The obtained emulsion could not well balance the mechanical property and the water vapor permeability.

Cheng You Kan et. al. discloses an acrylate-silicone copolymer emulsion synthesized by simultaneous free-radical and cationic copolymerization of acrylate monomers and silicone monomers in the presence of silane coupling agent in Journal of Applied Polymer Science, 2001, 82(13): 3194-3200. The obtained emulsion has uniform particles without core/shell structure.

Thus, there is still need to provide a dispersion being able to balance water vapor permeability, stability, and mechanical strength, which is well suited for preparing coatings, preferably exterior coatings, such as exterior wood/bamboo/rattan coatings and exterior wall coatings on buildings.

INVENTION SUMMARY

The present invention provides an aqueous polymer dispersion comprising a multistage emulsion polymer particle, said multistage emulsion polymer particle comprises:
(1) a polysiloxane formed in the first stage;
(2) a transition layer formed in the second stage; and
(3) a polyacrylate formed in the third stage;
wherein the transition layer is made of silane coupling agents.

The present invention also provides a method of preparing an aqueous polymer dispersion comprising a multistage emulsion polymer particle, said method comprises the steps of:
(1) preparing a polysiloxane in the first stage;
(2) preparing a transition layer on the polysiloxane in the second stage by reacting silane coupling agents at a temperature of 5° C. to 95° C., preferably 40° C. to 80° C., more preferably 60° C. to 80° C.; and
(3) preparing a polyacrylate on the transition layer in the third stage.

The present invention also provides a coating composition comprising:
(1) the aqueous polymer dispersion above; and
(2) optionally additives.

The present invention also provides use of said aqueous polymer dispersion for preparing coatings, preferably exterior wood/bamboo/rattan coatings.

Said aqueous polymer dispersion is well suited for preparing coatings, preferably exterior coatings, such as exterior wood/bamboo/rattan coatings and exterior wall coatings on buildings, and the resulted coatings can balance water vapor permeability, stability and mechanical strength. Furthermore, the conditions for preparing said aqueous polymer dispersion are moderate.

DRAWINGS

EMBODIMENTS

Figure 1:
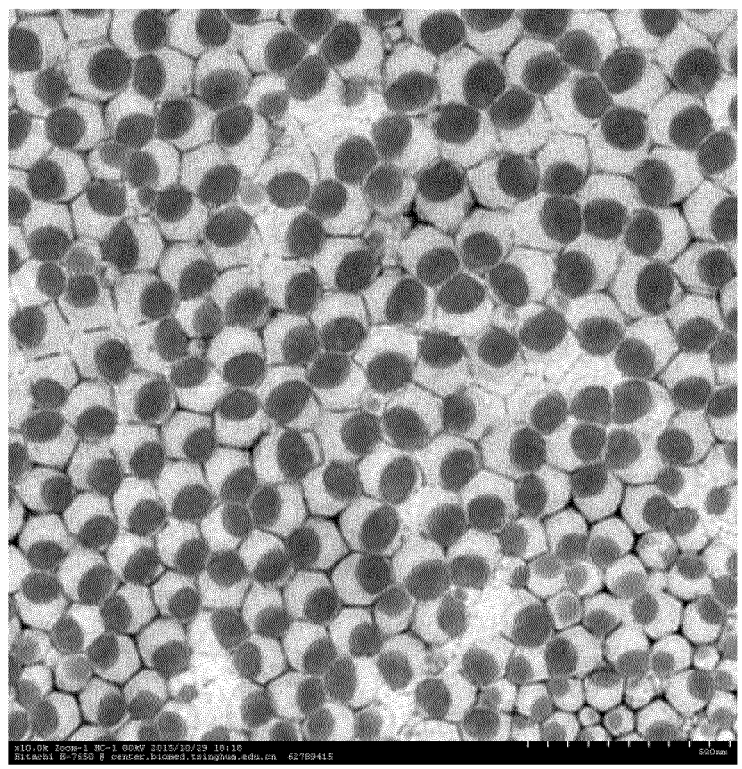
FIG. 1 shows a transmission electron microscope (TEM) graph of dispersion according to one embodiment (i.e. Example 2) of the present invention.
Figure 2:
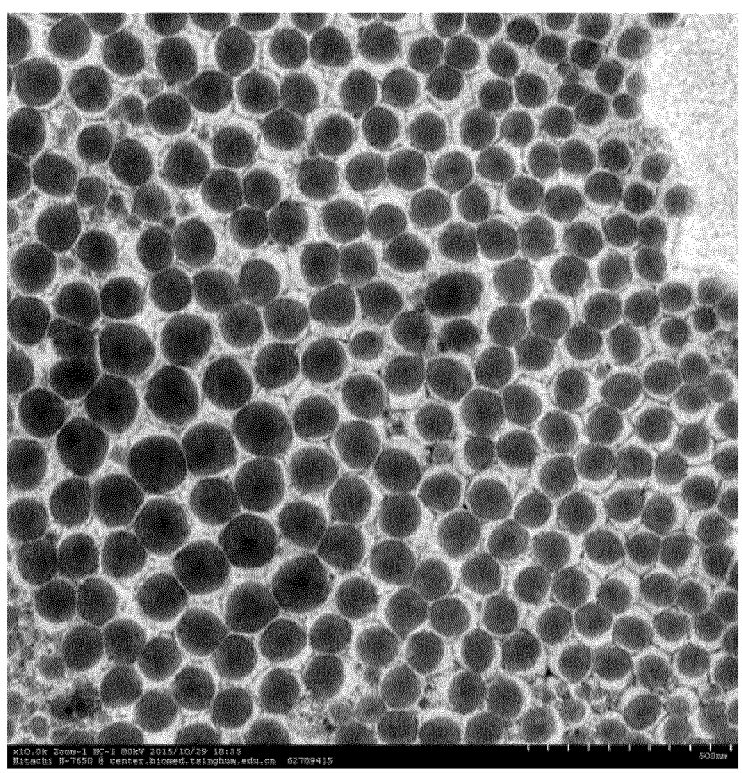
FIG. 2 shows a transmission electron microscope (TEM) graph of dispersion according to another embodiment (i.e. Example 6) of the present invention.
Figure 3:
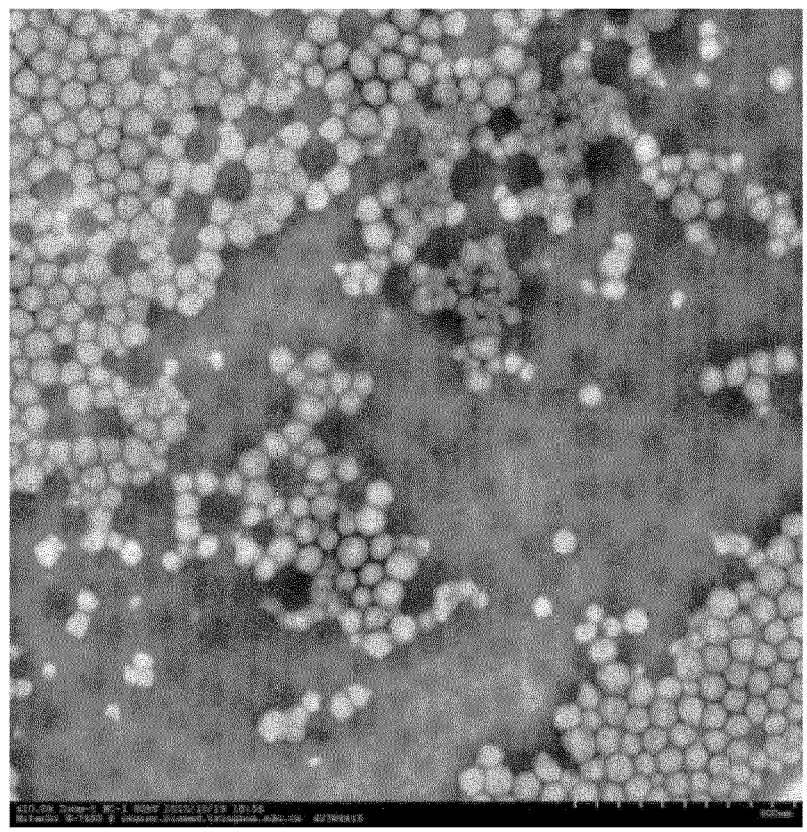
FIG. 3 shows a transmission electron microscope (TEM) graph of dispersion according to one comparative embodiment (i.e. Comparative Example 1) of the present invention.
Figure 4:
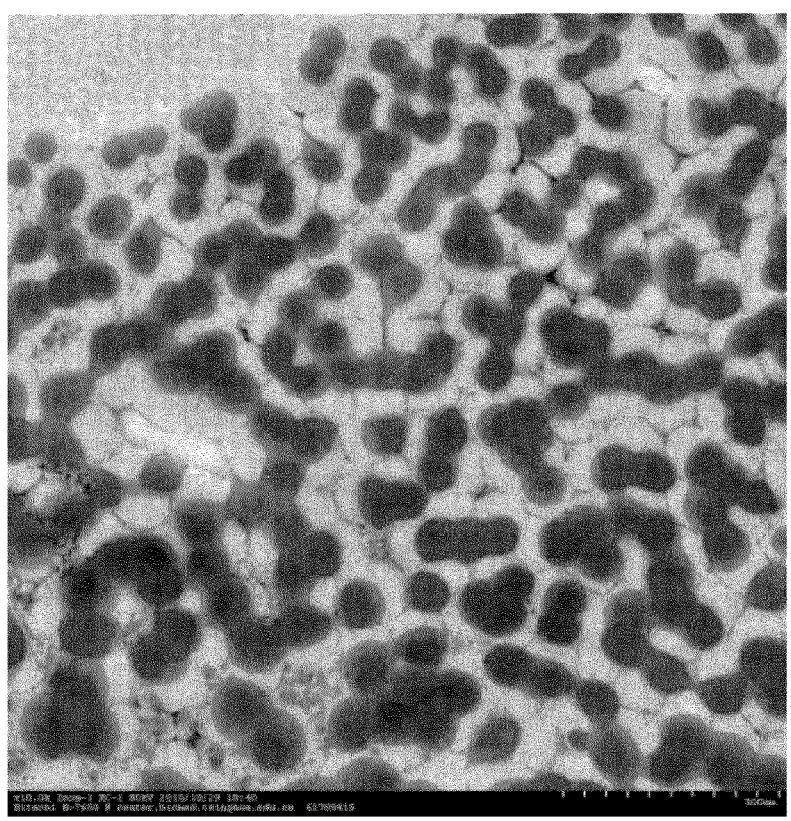
FIG. 4 shows a transmission electron microscope (TEM) graph of dispersion according to another comparative embodiment (i.e. Comparative Example 2) of the present invention.
Figure 5:
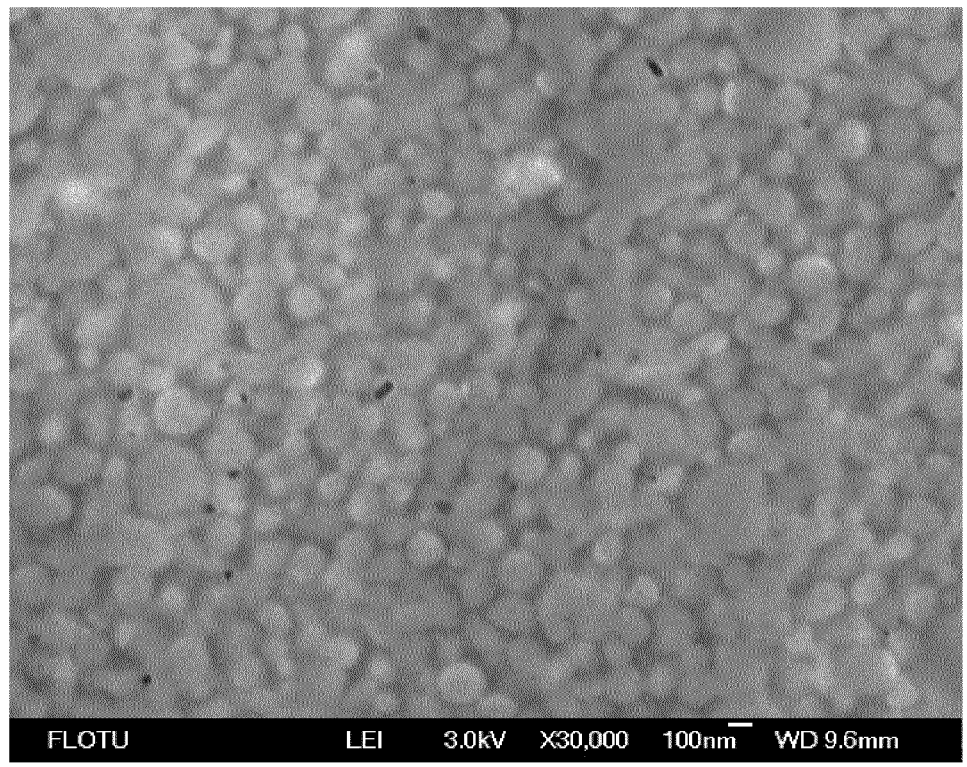
FIG. 5 shows a scanning electron microscope (SEM) graph of coating film according to one embodiment (i.e. Example 1) of the present invention.
Figure 6:
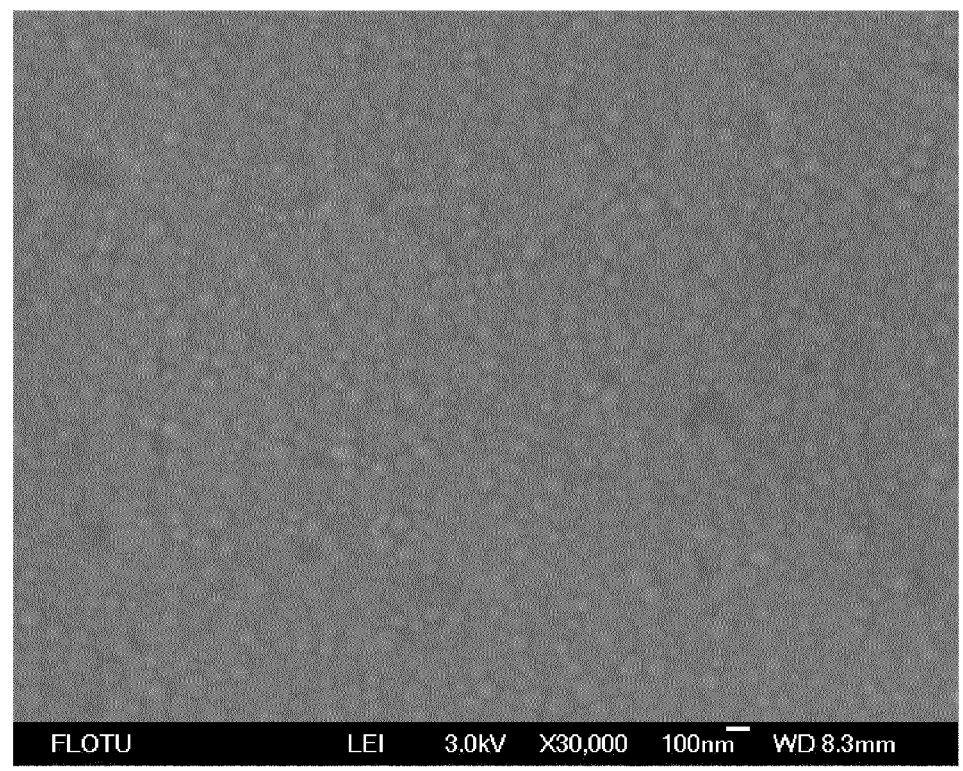
FIG. 6 shows a scanning electron microscope (SEM) graph of coating film according to another embodiment (i.e. Example 7) of the present invention.
Figure 7:
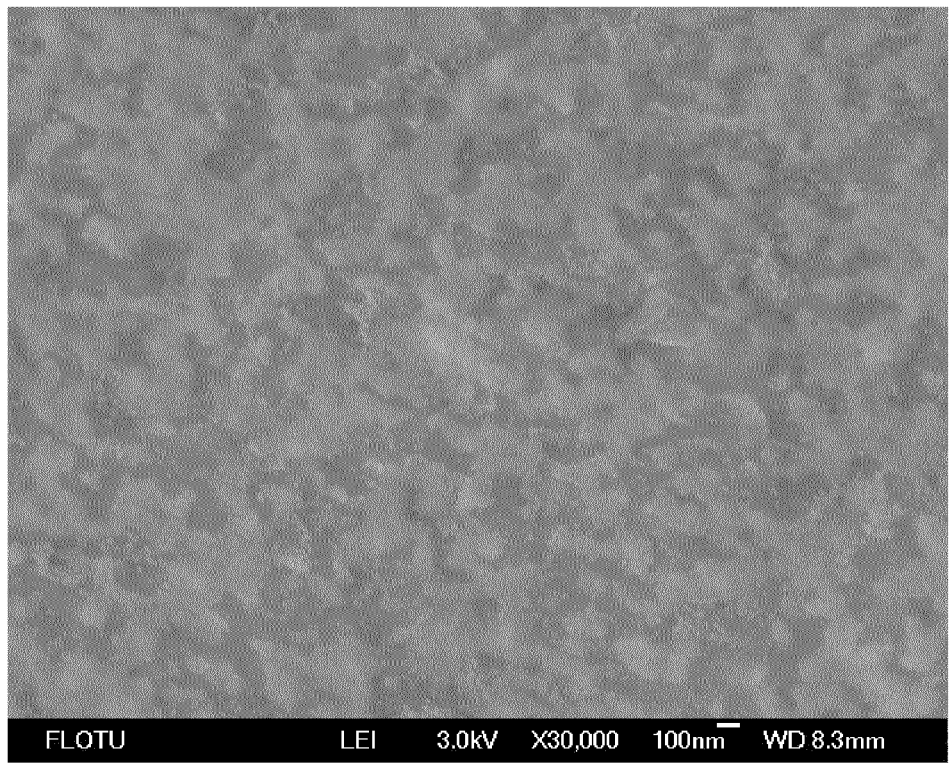
FIG. 7 shows a scanning electron microscope (SEM) graph of coating film according to one comparative embodiment (i.e. Comparative Example 1) of the present invention.

The present invention provides an aqueous polymer dispersion comprising a multistage emulsion polymer particle, said multistage emulsion polymer particle comprises:
(1) a polysiloxane formed in the first stage;
(2) a transition layer formed in the second stage; and
(3) a polyacrylate formed in the third stage;
wherein the transition layer is made of silane coupling agents.

In one preferred embodiment of the present invention, the multistage emulsion polymer particle has a core/shell structure with the polysiloxane as core and the polyacrylate as shell. The transition layer is positioned between the polysiloxane core and the polyacrylate shell.

According to the present invention, the polysiloxane is prepared from siloxane monomer represented by formula (I) and optionally vinyl monomer:

$$[Si(R^1R^2)O]_n, \qquad (I)$$

wherein n=3, 4, 5, 6, or 7, preferably n=4, $R^1$ and $R^2$ are independently selected from the group consisting of —H, $C_1$-$C_{20}$alkyl, $C_2$-$C_{20}$alkenyl and aryl, preferably —H, methyl, ethyl, vinyl, and phenyl.

Said vinyl monomers can be acrylate monomers, such as $C_1$-$C_{20}$alkyl acrylate and $C_1$-$C_{20}$alkyl methacrylate, preferably methyl acrylate, ethyl acrylate, methyl methacrylate, and ethyl methacrylate.

In one preferred embodiment of the present invention, the siloxane monomer is selected from hexamethyl cyclotrisiloxane, octamethyl cyclotetrasiloxane, decamethyl cyclopentasiloxane, and combination thereof.

According to the present invention, the silane coupling agents are represented by formula (II):

$$R^3SiR^4_n(OR^5)_{3-n}, \qquad (II)$$

wherein:
n=0, 1, or 2, preferably n=0 or 1;
$R^3$ is selected from the group consisting of acryloyloxy $C_1$-$C_{20}$alkyl, methacryloyloxy $C_1$-$C_{20}$alkyl, vinyl and allyl;
$R^4$ is selected from the group consisting of $C_1$-$C_{20}$alkyl and aryl, preferably methyl, ethyl, propyl, butyl and phenyl, more preferably methyl and ethyl; and
$R^5$ is selected from the group consisting of $C_1$-$C_{20}$alkyl and aryl, preferably methyl, ethyl, propyl, butyl and phenyl, more preferably methyl and ethyl.

In one preferred embodiment of the present invention, the silane coupling agents can be selected from 3-methacryloyloxypropyl trimethoxysilane, 3-methacryloxypropyl methyldimethoxysilane, vinyltrimethoxysilane, methylvinyldiethoxysilane, and combination thereof.

The polyacrylate is prepared from monomers represented by formula (III) and optionally monomers represented by $CH_2$=$CR^8$-Ph and $CH_2$=$CR^8$—CN:

$$CH_2\text{=}CR^6\text{—}COOR^7 \qquad (III)$$

wherein:
$R^6$ is selected from the group consisting of —H and $C_1$-$C_{20}$alkyl, preferably —H and —$CH_3$,
$R^7$ is selected from the group consisting of —H, $C_1$-$C_{20}$alkyl and hydroxy$C_1$-$C_{20}$alkyl, preferably —H, methyl, ethyl, propyl, butyl, pentyl, hexyl, heptyl, octyl, nonyl, decyl, hydroxyethyl and hydroxypropyl, and
$R^8$ is independently each other —H or —$CH_3$.

Monomers represented by formula (III) can comprise:
(a) monomers represented by formula (IV):

$$CH_2\text{=}CR^9\text{—}COOR^{10} \qquad (IV)$$

wherein:
$R^9$ is —H, and $R^{10}$ is selected from the group consisting of $C_1$-$C_{20}$alkyl, hydroxy$C_1$-$C_{20}$alkyl and aryl, preferably methyl, ethyl, propyl, butyl, pentyl, hexyl, heptyl, octyl, nonyl, decyl, hydroxyethyl, hydroxypropyl and phenyl; or $R^9$ is —$CH_3$, and $R^{10}$ is pentyl, hexyl, heptyl and octyl; and
(b) monomers represented by formula (V):

$$CH_2\text{=}CR^{11}\text{—}COOR^{12} \qquad (V)$$

wherein:
$R^{11}$ is —H, and $R^{12}$ is —H; or $R^{11}$ is —$CH_3$, and $R^{12}$ is selected from the group consisting of —H, methyl, ethyl, propyl, butyl hydroxyethyl, hydroxypropyl and phenyl.

The mass ratio of (a) monomers to (b) monomers can be adjusted if needed. In one preferred embodiment of the present invention, the mass ratio of (a) monomers to (b) monomers can vary from 90:10-10:90, preferably 80:20-20:80.

In one preferred embodiment of the present invention, the polysiloxane is prepared from siloxane monomer represented by formula (I) and optionally vinyl monomer:

$$[Si(R^1R^2)O]_n, \qquad (I)$$

wherein n=4, $R^1$ and $R^2$ are independently selected from the group consisting of —H, methyl, ethyl, vinyl, and phenyl; the transition layer is prepared from silane coupling agents represented by formula (II):

$$R^3SiR^4_n(OR^5)_{3-n}, \qquad (II)$$

wherein:
n=0 or 1;
$R^3$ is selected from the group consisting of acryloyloxy $C_1$-$C_{10}$alkyl, methacryloyloxy $C_1$-$C_{10}$alkyl, vinyl and allyl;
$R^4$ is selected from the group consisting of methyl, ethyl, propyl, butyl and phenyl; and
$R^5$ is selected from the group consisting of methyl, ethyl, propyl, butyl and phenyl; and the polyacrylate is prepared from monomers represented by formula (III) and optionally monomers selected from styrene and acrylonitrile:

$$CH_2\text{=}CR^6\text{—}COOR^7 \qquad (III)$$

wherein:
$R^6$ is selected from the group consisting of —H and —$CH_3$, and
$R^7$ is selected from the group consisting of —H, methyl, ethyl, propyl, butyl, pentyl, hexyl, heptyl, octyl, nonyl, decyl, hydroxyethyl and hydroxypropyl.

In one more preferred embodiment of the present invention, the polysiloxane is prepared from siloxane monomers selected from hexamethyl cyclotrisiloxane, octamethyl cyclotetrasiloxane, decamethyl, cyclopentasiloxane, and combination thereof; the transition layer is prepared from silane coupling agents selected from 3-methacryloyloxypropyl trimethoxysilane, 3-methacryloxypropylmethyldimethoxysilane, vinyltrimethoxysilane, methylvinyldiethoxysilane, and combination thereof; and the polyacrylate is prepared from monomers selected from methyl methacrylate, methyl acrylate, ethyl acrylate, ethyl methacrylate, n-propyl acrylate, n-propyl methacrylate, n-butyl acrylate, n-butyl methacrylate, n-pentyl acrylate, n-pentyl methacrylate, n-hexyl acrylate, n-hexyl methacrylate, n-heptyl acrylate, n-heptyl methacrylate, n-octyl acrylate, n-octyl methacrylate, 2-hydroxyethyl acrylate, 2-hydroxypropyl acrylate, styrene, acrylonitrile, and combination thereof.

According to the present invention, mass ratio of the polysiloxane to the polyacrylate is 10:90-90:10, preferably 10:90-80:20, more preferably 30:70-70:30.

According to the present invention, the multistage emulsion polymer particle have particle size of about 50 nm to about 1000 nm, preferably about 80 nm to about 500 nm.

According to the present invention, the multistage emulsion polymer particle contains 10-90 wt % polysiloxane, 90-10 wt % polyacrylate and 0.1-30 wt % transition layer, the sum of percentage is 100 wt %.

According to the present invention, the aqueous polymer dispersion has solid content of about 10 wt % to about 55 wt %, preferably about 25 wt % to about 45 wt % based on the total weight of the aqueous polymer dispersion.

According to the present invention, the aqueous polymer dispersion can further comprise an additive selected from pH modifiers, leveling agents, bleachers, complexing agents, deodorants, odorants, viscosity modifiers, pigments, surfactants, thickeners, film-forming polymers, wetting agents, dispersants, fillers, defoamers, biocides, flow control agents, and combination thereof.

The present invention provides a method of preparing an aqueous polymer dispersion comprising a multistage emulsion polymer particle, said method comprises the steps of:

(1) preparing a polysiloxane in the first stage;

(2) preparing a transition layer on the polysiloxane in the second stage by reacting silane coupling agents at a temperature of 5° C. to 95° C., preferably 40° C. to 80° C., more preferably 60° C. to 80° C.; and (3) preparing a polyacrylate on the transition layer in the third stage.

The preparation of polysiloxane in the first stage is carried out using the above siloxane monomers and optional vinyl monomers by emulsion polymerization optionally in the presence of silicone crosslinker, catalyst and surfactant at a temperature of 50 to 95° C. for 4-72 h. Preferably, the temperature is 70 to 95° C. and the reaction time is 8 to 24 h.

Said silicone crosslinker is represented by formula (VI):

wherein:
n=3 or 4,
$R^{13}$ and $R^{14}$ are independently selected from the group consisting of $C_1$-$C_{20}$alkyl and aryl, preferably methyl, ethyl, propyl and phenyl. The amount of silicone crosslinker used is 0-50 wt %, preferably 0-30 wt %, more preferably 1-25 wt % based on the total weight of siloxane monomers.

Said catalyst is Lewis acid such as $H_2SO_4$, HCl, $FeCl_3$, dodecylbenzene sulfonic acid (DBSA), preferably DBSA, or Lewis base such as KOH, quaternary ammonium hydroxide, preferably quaternary ammonium hydroxide. The amount of catalyst used is 0-10 wt %, preferably 0.5-5 wt % based on the total weight of siloxane monomers.

The surfactant is selected from anionic emulsifier (AE) such as sodium dodecyl sulfate (SDS), sodium dodecyl benzene sulfonate (SDBS) available in the market, preferably SDBS, and non-ionic emulsifier (NE) such as OP series, Tween series, Span series, preferably OP series available in the market, and combination of two emulsifiers such as NE:AE=4:1-1:4. The amount of surfactant is 0-3 wt %, preferably 0-2 wt %, more preferably 0.1-1.5 wt % based on the total weight of siloxane monomers.

According to the present invention, the reaction time of said silane coupling agents above in the emulsion polymerization is 0.2 to 12 h, preferably 1 to 4 h at a temperature of about 40° C. to about 80° C., preferably about 60° C. to about 80° C.

The preparation of polyacrylate is carried out using the above acrylate monomers by emulsion polymerization optionally in the presence of crosslinker, initiator and surfactant at a temperature of 40 to 90° C. for 2-5 h. Preferably, the temperature is 70 to 85° C. and the reaction time is 2 to 4 h.

According to the present invention, said crosslinker in the preparation of polyacrylate is a compound with more than two polymerizable carbon carbon double bonds such as allyl methacrylate (AMA), ethyleneglycol dimethacrylate (EGDMA), divinylbenzene (DVB), and triallyl cyanurate (TAC), preferably EGDMA and DVB. The amount of said crosslinker used is 0-5 wt %, preferably 0-1 wt %, more preferably 0.1-1 wt % based on the total weight of monomers for preparation of the polyacrylate.

According to the present invention, said initiator is a water-soluble initiator such as potassium persulfate (KPS), ammonium persulfate (APS), 2,2'-azobis(2-methylpropionamide) dihydrochloride (AIBA), 4,4'-azobis(4-cyanovaleric acid) (ACVA), and redox system, preferably KPS and APS. The amount of initiator used is 0.5-2 wt %, preferably 0.8-1.2 wt % based on the total weight of monomers for preparation of the polyacrylate.

According to the present invention, the surfactant in the preparation of polyacrylate is selected from anionic emulsifier (AE) such as SDS, SDBS available in the market, preferably SDS, and non-ionic emulsifier(NE) such as OP series, Tween series, Span series available in the market, and combination of two emulsifiers such as NE:AE=4:1-1:4, preferably OP:SDS=2:1-1:2. The amount of surfactant used is 0-3 wt %, preferably 0.5-2 wt % based on the total weight of monomers for preparation of the polyacrylate.

In one preferred embodiment of the present invention, acrylate monomers or acrylate monomer pre-emulsion can be added dropwise within 1-6 h, preferably 2-6 h when preparing the polyacrylate.

Examples of acrylate monomers include methyl methacrylate, methyl acrylate, ethyl acrylate, ethyl methacrylate, n-propyl acrylate, n-propyl methacrylate, n-butyl acrylate, n-butyl methacrylate, n-pentyl acrylate, n-pentyl methacrylate, n-hexyl acrylate, n-hexyl methacrylate, n-heptyl acrylate, n-heptyl methacrylate, n-octyl acrylate, n-octyl methacrylate, 2-hydroxyethyl acrylate, 2-hydroxypropyl acrylate, and combination thereof.

According to the present invention, said emulsion polymerization is a customary method in the art. It is preferable to operate in the absence of oxygen, more preferably in a stream of nitrogen. Customary apparatus can be employed for the polymerization procedure, such as stirring tanks, stirring tank cascades, autoclaves, tubular reactors and kneaders.

In one embodiment of the present invention, the aqueous polymer dispersion obtained after the end of the polymerization stages can be subjected to an aftertreatment for the purpose of reducing the residual monomer content. This aftertreatment takes place chemically, as for example by completion of the polymerization reaction through the use of a more effective free-radical initiator system (referred to as post polymerization), and/or physically, as for example by stripping of the aqueous polymer dispersion using steam or inert gas.

When the emulsion polymerization is carried out, the monomers may be wholly or partly neutralized with bases before or during the polymerization. Useful bases include for example alkali metal or alkaline earth metal compounds such as sodium hydroxide, potassium hydroxide, calcium hydroxide, magnesium oxide, sodium carbonate; ammonia; primary, secondary and tertiary amines.

In the text of the present invention, the term "multistage emulsion polymer particle" means a particle obtained by multistage emulsion polymerization.

The present invention also provides a coating composition comprising:

(1) the aqueous polymer dispersion above; and (2) optionally additives.

According to the present invention, said additives can be selected from pH modifiers, leveling agents, bleachers, complexing agents, deodorants, odorants, viscosity modifiers, pigments, surfactants, thickeners, film-forming polymers, wetting agents, dispersants, fillers, defoamers, biocides, flow control agents, and combination thereof.

The content of the aqueous polymer dispersion is in the range of 30 wt % to 100 wt %, preferably 50 wt % to 90 wt % based on the total weight of the coating composition. The content of the additives is in the range of 0 wt % to 30 wt %, preferably 5 wt % to 15 wt % based on the total weight of the coating composition, if present.

Said coating composition can be prepared by conventional methods in the arts. For example, the coating composition is produced in a known way by blending the components in mixing equipment customary for the purpose.

The coating composition of the present invention can be applied to substrates in a customary way, as for example by spreading, spraying, dipping, rolling or knife coating.

Said coating composition can be used to prepare exterior wood/bamboo/rattan coatings and exterior wall coatings on buildings.

In one embodiment, the present invention provides use of said aqueous polymer dispersion to achieve good water vapor permeability and good mechanical property simultaneously, in the application of coatings, preferably exterior wood/bamboo/rattan coatings.

All percentages and ratios are mentioned by weight unless otherwise indicated.

EXAMPLES

The present invention is now further illustrated by reference to the following examples, however, the examples are used for the purpose of explanation and not intended to limit the scopes of the present invention.

Substances applied:
Octamethyl cyclotetrasiloxane, polymer grade
Tetraethoxysilane(TEOS), AR grade
Methyltrimethoxysilane(MTMS), AR grade
Dodecyl benzene sulfonic acid(DBSA), 90% purity
3-Methacryloyloxypropyl trimethoxysilane(MATS), chemically pure
3-Methacryloxypropylmethyldimethoxysilane (MAMDS), chemically pure
Vinyltrimethoxysilane(VTMS), chemically pure
Methylvinyldiethoxysilane(MVDS), chemically pure
Butyl acrylate(BA), polymer grade
Ethyl acrylate(EA), polymer grade
Styrene(St), polymer grade
Methyl methacrylate(MMA), polymer grade
Methacrylic acid(MAA), polymer grade
Ethylene glycol dimethyl acrylate(EGDMA), polymer grade
Divinylbenzene(DVB), polymer grade
Emulsifier OP-10, chemically pure
Sodium dodecyl sulfate(SDS), AR grade
Ammonium persulfate(APS), AR grade Measuring and test methods:
Solid Content Solid Content (S, wt %) was measured by gravimetric analysis, which was calculated as below:

$$S = w_2/w_1 \times 100\%$$

where $w_1$ denotes the weight of dispersion sample, while $w_2$ denotes the weight of the same sample after drying for 24 h at 80° C.

Particle Size and its Distribution

Hydrodynamic diameter ($D_p$) and polydispersity index (Poly index) of the polymer particles were determined by Zetasizer 3000HS (Malvern, UK) at 25° C.

Morphologies of Polymer Particles and Coating Films

Morphology of the polymer particles was characterized by transmission electron microscopy with phosphotungstic acid as staining agent (TEM, JEOL JEM-1200EX, Japan).

Morphology of the cross-section of coating films was observed by scanning electron microscope (SEM, JEOL JSM-7401, Japan)

Water Vapor Permeability of Coating Films

Coating film was obtained by casting the dispersions on PE plate at room temperature. The water vapor permeability (WVP) of different coating films was measured by gravimetric analysis at 25° C., 50% RH (Temperature humidity chamber, Shanghai Jiayu Scientific Instrument Co. Ltd., JYH-103). The saturated $NH_4H_2PO_4$ solution was used for the test and the sample area was 50 $cm^2$. The mass loss was measured every 24 h.

Value of WVP was calculated as below:

$$WVP = \Delta m \cdot d / (A \cdot t \cdot p \cdot (R_1 - R_2))$$

where $\Delta m$ denotes the mass loss, g; d denotes the thickness of the film, cm; A denotes the area of the cup, 50 $cm^2$; t denotes the time interval between the measurements, 24 h; p denotes the saturated vapor pressure of water at test temperature, i.e. 3169 Pa at 25° C.; $R_1$ (100% RH) and $R_2$ (50% RH) denotes relative humidity of the atmosphere inside and outside the cup, respectively.

Glass Transition Temperature ($T_g$)

$T_g$ of coating films was determined by dynamic mechanical analyzer DMA Q800 (Waters, USA). Frequency was fixed at 1 Hz and test temperature was from −140° C. to 55° C. with the heating rate at 4° C./min.

Tensile Strength and Elongation at Break of Coating Films

Tensile test of coating films was performed by tensile testing machine (Gotech testing machines INC., AI-7000 M) at 25° C. with speed of 50 mm/min.

Example 1

1.2 g of DBSA was firstly dissolved in 240 g of $H_2O$, then the DBSA solution and 60 g of octamethyl cyclotetrasiloxane were charged into a 1 L-reactor. The mixture was emulsified and then deoxidized with flowing nitrogen for 0.5 h at room temperature. After that, emulsion polymerization was carried out at 90° C. for 12 h. After polymerization, the reaction system was cooled to room temperature and neutralized with aqueous ammonia to pH 7-8 to obtain PSi core.

18 g of VTMS was dropwise added into the obtained PSi core, and reaction was carried out at 70° C. for 2 h to obtain a transition layer.

After then, free radical emulsion polymerization was initiated at 80° C. by adding one-third of APS solution (1.2 g of APS was dissolved in 40 g of $H_2O$ beforehand). The monomer emulsion, which was previously prepared from 30 g of BA, 30 g of MMA, 0.6 g of MAA, 1.2 g of OP-10 and 200 g of $H_2O$, was dropwise added into the reactor within 3 h. One-third of APS solution was added when half monomer emulsion was introduced, and the residual APS solution was then added after the adding of monomer emulsion was complete. Followed by an extension of polymerization time of 1.5 h, the reaction mixture was cooled to room temperature to obtain PSi/PA polymer dispersion.

Example 2

1 g of DBSA was firstly dissolved in 150 g of $H_2O$, then the DBSA solution, 45 g of octamethyl cyclotetrasiloxane and 5 g of TEOS were charged into a 1 L-reactor. The mixture was emulsified and deoxidized with flowing nitrogen for 0.5 h at room temperature. After that, PSi core emulsion polymerization was carried out at 85° C. for 16 h.

After the polymerization, the reaction system was cooled to room temperature and neutralized with aqueous ammonia to pH 7-8 to obtain PSi core.

10 g of MVDS was dropwise added into the obtained PSi core, and reaction was carried out at 80° C. for 1 h to obtain a transition layer.

After then, free radical emulsion polymerization was initiated at 85° C. by adding one-third of APS solution (0.8 g APS was dissolved in 30 g of $H_2O$ beforehand). The monomer emulsion, which was previously prepared from 50 g of BA, 50 g of St, 0.4 g of EGDMA, 0.4 g of DVB, 1.6 g of OP-10 and 270 g of $H_2O$, was drop-wise added into the reactor within 6 h. One-third of APS solution was added when half monomer emulsion was introduced, and the residual APS solution was then added after the adding of monomer emulsion was complete. Followed by an extension of polymerization time of 1 h, PSi/PA polymer dispersion was obtained.

Example 3

0.75 g of DBSA and 0.75 g of OP-10 were firstly dissolved in 225 g of $H_2O$, then the DBSA solution, 68 g of octamethyl cyclotetrasiloxane and 7 g MTMS were charged into a 1 L-reactor. The mixture was emulsified and deoxidized with flowing nitrogen for 0.5 h at room temperature. After that, emulsion polymerization was carried out at 80° C. for 20 h. After polymerization, the reaction system was cooled to room temperature and neutralized with aqueous ammonia to pH 7-8 to obtain PSi core.

3.75 g of MATS was dropwise added into the obtained PSi core, and reaction was carried out at 70° C. for 2 h to obtain a transition layer.

After then, free radical emulsion polymerization was initiated at 80° C. by adding one-third of APS solution (0.6 g of APS was dissolved in 30 g of $H_2O$ beforehand). The monomer emulsion, which was previously prepared from 56.5 g of EA, 18.5 g of MMA, 1.2 g of OP-10 and 195 g of $H_2O$, was dropwise added into the reactor within 3 h. One-third of APS solution was added when half monomer emulsion was introduced, and the residual APS solution was then added after the adding of monomer emulsion was complete. Followed by an extension of polymerization time of 1.5 h, the reaction mixture was cooled to room temperature to obtain PSi/PA polymer dispersion.

Example 4

2.4 g of DBSA was firstly dissolved in 280 g of $H_2O$, then the DBSA solution, 114 g of octamethyl cyclotetrasiloxane and 6 g of TEOS were charged into a 1 L-reactor. The mixture was emulsified and deoxidized with flowing nitrogen for 0.5 h at room temperature. After that, PSi core emulsion polymerization was carried out at 90° C. for 12 h. After the polymerization, the reaction system was cooled to room temperature and neutralized with aqueous ammonia to pH 7-8 to obtain PSi core.

6 g of VTMS was dropwise added into the obtained PSi core, and reaction was carried out at 60° C. for 4 h to obtain a transition layer.

After then, free radical emulsion polymerization was initiated at 80° C. by adding one-third of APS solution (0.4 g APS was dissolved in 20 g of $H_2O$ beforehand). The monomer emulsion, which was previously prepared from 40 g of BA, 20 g of St, 0.5 g of MMA, 0.6 g of OP-10, 0.6 g of SDS and 120 g of $H_2O$, was drop-wise added into the reactor within 6 h. One-third of APS solution was added when half monomer emulsion was introduced, and the residual APS solution was then added after the adding of monomer emulsion was complete. Followed by an extension of polymerization time of 1.5 h, PSi/PA polymer dispersion was obtained.

Example 5

0.9 g of DBSA and 0.3 g of OP-10 were firstly dissolved in 140 g of $H_2O$, then the DBSA solution, 54 g of octamethyl cyclotetrasiloxane and 6 g of MTMS were charged into a 1 L-reactor. The mixture was emulsified and deoxidized with flowing nitrogen for 0.5 h at room temperature. After that, emulsion polymerization was carried out at 85° C. for 16 h. After polymerization, the reaction system was cooled to room temperature and neutralized with aqueous ammonia to pH 7-8 to obtain PSi core.

6 g of MATS was dropwise added into the obtained PSi core, and reaction was carried out at 70° C. for 2 h to obtain a transition layer.

After then, the free radical emulsion polymerization was initiated at 75° C. by adding one-third of APS solution (1.2 g of APS was dissolved in 60 g of $H_2O$ beforehand). The monomer emulsion, which was previously prepared from 60 g of EA, 60 g of St, 1.2 g of OP-10, 1.2 g of SDS and 220 g of $H_2O$, was dropwise added into the reactor within 5 h. One-third of APS solution was added when half monomer emulsion was introduced, and the residual APS solution was then added after the adding of monomer emulsion was complete. Followed by an extension of polymerization time of 2 h, the reaction mixture was cooled to room temperature to obtain PSi/PA polymer dispersion.

Example 6

4.5 g of DBSA was firstly dissolved in 210 g of $H_2O$, then the DBSA solution, 72 g of octamethyl cyclotetrasiloxane and 18 g of MTMS were charged into a 1 L-reactor. The mixture was emulsified and deoxidized with flowing nitrogen for 0.5 h at room temperature. After that, emulsion polymerization was carried out at 90° C. for 12 h. After polymerization, the reaction system was cooled to room temperature and neutralized with aqueous ammonia to pH 7-8 to obtain PSi core.

18 g of MAMDS was dropwise added into the obtained PSi core, and reaction was carried out at 60° C. for 4 h to obtain a transition layer.

After then, the free radical emulsion polymerization was initiated at 80° C. by adding one-third of APS solution (0.9 g of APS was dissolved in 50 g of $H_2O$ beforehand). The monomer emulsion, which was previously prepared from 35 g of BA, 55 g of St, 0.9 g of OP-10, 0.9 g of SDS and 160 g of $H_2O$, was dropwise added into the reactor within 3 h. One-third of APS solution was added when half monomer emulsion was introduced, and the residual APS solution was then added after the adding of monomer emulsion was complete. Followed by an extension of polymerization time of 1.5 h, the reaction mixture was cooled to room temperature to obtain PSi/PA polymer dispersion.

Example 7

2.1 g of DBSA was firstly dissolved in 195 g of $H_2O$, then the DBSA solution, 95 g of octamethyl cyclotetrasiloxane and 10 g of TEOS were charged into a 1 L-reactor. The mixture was emulsified and deoxidized with flowing nitrogen for 0.5 h at room temperature. After that, emulsion polymerization was carried out at 95° C. for 10 h. After polymerization, the reaction system was cooled to room temperature and neutralized with aqueous ammonia to pH 7-8 to obtain PSi core.

5.25 g of VTMS was dropwise added into the obtained PSi core, and reaction was carried out at 60° C. for 4 h to obtain a transition layer.

After then, the free radical emulsion polymerization was initiated at 75° C. by adding one-third of APS solution (0.9 g of APS was dissolved in 40 g of $H_2O$ beforehand). The monomer emulsion, which was previously prepared from 52.5 g of BA, 52.5 g of St, 0.9 g of OP-10, 0.9 g of SDS and 155 g of $H_2O$, was dropwise added into the reactor within 3 h. One-third of APS solution was added when half monomer emulsion was introduced, and the residual APS solution was then added after the adding of monomer emulsion was complete. Followed by an extension of polymerization time of 2 h, the reaction mixture was cooled to room temperature to obtain PSi/PA polymer dispersion.

Example 8

1.8 g of DBSA was firstly dissolved in 180 g of $H_2O$, then the DBSA solution, 114 g of octamethyl cyclotetrasiloxane and 6 g of TEOS were charged into a 1 L-reactor. The mixture was emulsified and deoxidized with flowing nitrogen for 0.5 h at room temperature. After that, emulsion polymerization was carried out at 85° C. for 16 h. After polymerization, the reaction system was cooled to room temperature and neutralized with aqueous ammonia to pH 7-8 to obtain PSi core.

6 g of MVDS was dropwise added into the obtained PSi core, and reaction was carried out at 70° C. for 2 h to obtain a transition layer.

After then, the free radical emulsion polymerization was initiated at 75° C. The monomer emulsion, which was previously prepared from 90 g EA, 30 g St, 1.6 g OP-10, 0.8 g SDS, 1.2 g APS and 115 g of $H_2O$, was drop-wise added into the reactor within 10 h. Followed by an extension of polymerization time of 2 h, PSi/PA polymer dispersion was obtained.

Example 9: PSi Core was Prepared in the Presence of Acrylates 1.2 g of DBSA and 0.12 g of APS was firstly dissolved in 240 g of $H_2O$, then the DBSA solution, 54 g of octamethyl cyclotetrasiloxane, 6 g of MATS, 6 g of BA and 6 g of MMA were charged into a 1 L-reactor. The mixture was emulsified and then deoxidized with flowing nitrogen for 0.5 h at room temperature. After that, emulsion polymerization was carried out at 90° C. for 12 h. After polymerization, the reaction system was cooled to room temperature and neutralized with aqueous ammonia to pH 7-8 to obtain PSi core.

3 g of MATS was dropwise added into the obtained PSi core, and reaction was carried out at 60° C. for 4 h to obtain a transition layer.

After then, free radical emulsion polymerization was initiated at 80° C. by adding one-third of APS solution (1.2 g of APS was dissolved in 40 g of $H_2O$ beforehand). The monomer emulsion, which was previously prepared from 30 g of BA, 30 g of MMA, 1.2 g of OP-10 and 200 g of $H_2O$, was dropwise added into the reactor within 3 h. One-third of APS solution was added when half monomer emulsion was introduced, and the residual APS solution was then added after the adding of monomer emulsion was complete. Followed by an extension of polymerization time of 1.5 h, the reaction mixture was cooled to room temperature to obtain PSi/PA polymer dispersion.

Comparative Example 1

The pure PSi emulsions are prepared as follows: 3.6 g of DBSA was firstly dissolved in 420 g of $H_2O$, then the DBSA solution, 162 g of octamethyl cyclotetrasiloxane and 18 g of TEOS were charged into a 1 L-reactor. The PSi emulsion polymerization was carried out at 90° C. for 12 h. After the polymerization, the PSi emulsions were cooled to room temperature and neutralized with aqueous ammonia to pH 7-8.

The pure PA emulsions are prepared by the process as follows. 380 g of $H_2O$, 3.6 g of SDS, the monomer mixture (90 g of BA, 90 g of MMA and 1.5 g of EGDMA) and 50 wt % of APS solution (1.5 g of APS was dissolved in 40 g of $H_2O$ beforehand) were first charged into a 1 L-reactor, and the polymerization was then carried out at 80° C. When half monomer emulsion was introduced, 25 wt % APS solution was added. The residual APS solution was then added after the adding of monomer emulsion was complete, and the polymerization lasted for another 1.5 h.

Then, PSi emulsion and PA emulsion were blended with the same solid amount by stirring at room temperature for 24 h.

Comparative Example 2

1.8 g of DBSA was firstly dissolved in 210 g of $H_2O$, then the DBSA solution, 81 g of octamethyl cyclotetrasiloxane and 9 g MTMS were charged into a 1 L-reactor. The mixture was emulsified and deoxidized with flowing nitrogen for 0.5 h at room temperature. After that, emulsion polymerization was carried out at 90° C. for 12 h. After polymerization, the reaction system was cooled to room temperature and neutralized with aqueous ammonia to pH 7-8 to obtain PSi core.

After then, free radical emulsion polymerization was initiated at 75° C. by adding one-third of APS solution (1.2 g of APS was dissolved in 40 g of $H_2O$ beforehand). The monomer emulsion, which was previously prepared from 45 g of BA, 45 g of MMA, 0.6 g of MAA, 1.2 g of OP-10 and 170 g of $H_2O$, was dropwise added into the reactor within 3 h. One-third of APS solution was added when half monomer emulsion was introduced, and the residual APS solution was then added after the adding of monomer emulsion was complete. Followed by an extension of polymerization time of 2 h, the reaction mixture was cooled to room temperature to obtain PSi/PA polymer dispersion.

Comparative Example 3

The pure PA emulsions are prepared by the process as follows. 380 g of $H_2O$, 3.6 g of SDS, the monomer mixture (90 g of BA, 45 g of St and 45 g of MMA) and 50 wt % of APS solution (1.5 g of APS was dissolved in 40 g of $H_2O$ beforehand) were first charged into a 1 L-reactor, and the polymerization was then carried out at 80° C. When half monomer emulsion was introduced, 25 wt % APS solution was added. The residual APS solution was then added after the adding of monomer emulsion was complete, and the polymerization lasted for another 1.5 h.

Comparative Example 4

3.6 g of DBSA was firstly dissolved in 420 g of $H_2O$, then the DBSA solution, 162 g of octamethyl cyclotetrasiloxane and 18 g MTMS were charged into a 1 L-reactor. The mixture was emulsified and deoxidized with flowing nitrogen for 0.5 h at room temperature. After that, emulsion polymerization was carried out at 95° C. for 10 h. After polymerization, the reaction system was cooled to room temperature and neutralized with aqueous ammonia to pH 7-8 to obtain PSi core.

Comparative Example 5: Coupling Agent was Added Together with Acrylate Monomers 1.2 g of DBSA was firstly dissolved in 140 g of $H_2O$, then the DBSA solution, 54 g of octamethyl cyclotetrasiloxane and 6 g of TEOS were charged into a 1 L-reactor. The mixture was emulsified and deoxidized with flowing nitrogen for 0.5 h at room temperature. After that, emulsion polymerization was carried out at 85° C. for 16 h. After polymerization, the reaction system was cooled to room temperature and neutralized with aqueous ammonia to pH 7-8 to obtain PSi core.

Then, the free radical emulsion polymerization was initiated at 80° C. by adding one-third of APS solution (1.2 g of APS was dissolved in 60 g of $H_2O$ beforehand). The monomer emulsion, which was previously prepared from 60 g of BA, 60 g of MMA, 4.5 g of MATS, 1.6 g of OP-10, 0.8 g of SDS and 220 g of $H_2O$, was dropwise added into the reactor within 5 h. One-third of APS solution was added when half monomer emulsion was introduced, and the residual APS solution was then added after the adding of monomer emulsion was complete. Followed by an extension of polymerization time of 2 h, the reaction mixture was cooled to room temperature to obtain PSi/PA polymer dispersion.

TABLE 1

Measurement results of polymer dispersions according to examples 1-9 and comparative examples 1-5

| No. | $D_p$/nm | Poly. Index | Solid content/% |
|---|---|---|---|
| Example 1 | 201.5 | 0.077 | 21.8 |
| Example 2 | 158.9 | 0.065 | 25.7 |
| Example 3 | 112.5 | 0.104 | 24.8 |
| Example 4 | 154.5 | 0.099 | 30.0 |
| Example 5 | 115.6 | 0.103 | 29.9 |
| Example 6 | 90.5 | 0.043 | 31.3 |
| Example 7 | 124.9 | 0.056 | 34.2 |
| Example 8 | 124.6 | 0.105 | 44.3 |
| Example 9 | 136.5 | 0.123 | 21.1 |
| Comparative example 1 | 108.5(PSi) 58.8(PA) | — | 29.5 |
| Comparative example 2 | 122.0 | 0.132 | 29.3 |
| Comparative example 3 | 58.8 | 0.084 | 31.2 |
| Comparative example 4 | 110.8 | 0.152 | 29.2 |
| Comparative example 5 | 133.0 | 0.094 | 29.6 |

Coating films with about 0.5 mm in thickness were obtained by casting and drying the dispersions on PE plate at room temperature, and then were used for preparing film samples with certain shape and size. Circular coating films with more than 80 mm in diameter were utilized for measurement of water vapor permeability. Rectangular coating films with about 6 mm in width and 20 mm in length were for dynamic mechanical analysis, and 10 mm in width and 60 mm in length were prepared for tensile test, respectively.

TABLE 2

Measurement results of coating films according to examples 1-9 and comparative examples 1-5

| No. | WVP × 10$^9$/ g · cm$^{-1}$ · h$^{-1}$ · Pa$^{-1}$ | $T_g$*/° C. | Tensile strength/ MPa | Elongation at break/ % |
|---|---|---|---|---|
| Example 1 | 2.75 | −137, 25 | 5.5 | 90 |
| Example 2 | 2.82 | −133, 32 | 5.0 | 230 |
| Example 3 | 4.22 | −128, 20 | 4.5 | 365 |
| Example 4 | 3.95 | −127, 8 | 4.0 | 195 |
| Example 5 | 2.77 | −131, 19 | 4.9 | 315 |
| Example 6 | 3.58 | −132, 40 | 5.1 | 200 |
| Example 7 | 3.64 | −128, 24 | 4.6 | 380 |
| Example 8 | 4.05 | −129, −2 | 4.6 | 375 |
| Example 9 | 3.44 | −137, 25 | 4.7 | 355 |
| Comparative example 1 | 4.80 | — | 1.0 | 135 |
| Comparative example 2 | 4.97 | −132, 24 | 2.8 | 400 |
| Comparative example 3 | 2.51 | 38 | 4.9 | 405 |
| Comparative example 4 | 6.76 | −125 | 0.8 | 130 |
| Comparative example 5 | 2.78 | −132, 23 | 4.6 | 290 |

*There were two different glass transition temperature ($T_g$) values for each coating film, wherein the lower $T_g$ and the higher $T_g$ corresponded to PSi and PA in the coating film, respectively.

Table 2 shows that coating films according to the present invention have good water vapor permeability and good mechanical strength simultaneously. Coating films according to comparative examples 1, 2 and 4 have poorer mechanical strength. Pure polyacrylate coating film according to comparative example 3 has good mechanical strength but poorer water vapor permeability and stabilities such as weather resistance and stain resistance relative to coating films of the present invention.

Comparative example 5 relates to a method of preparing PSi/PA polymer dispersion without silicone transition layer, wherein the coupling agent and acrylate monomers are introduced into the polymerization reaction together. The obtained dispersion bears worse stability (i.e. obvious increase of particle size and at least 50% increment of dispersion viscosity after 6-months of storage, even losing fluidity) when compared to Example 1-9 (negligible variation of particle size and dispersion viscosity after 18-months of storage).

It will be apparent to those skilled in the art that various modifications and variations can be made in the present invention without departing from the scope or spirit of the present invention. Thus, it is intended that the present invention cover such modifications and variations as come within the scope of the appended claims and their equivalents.

The invention claimed is:

1. An aqueous polymer dispersion, comprising a multistage emulsion polymer particle, said multistage emulsion polymer particle consisting of:
   (1) a polysiloxane formed in the first stage;
   (2) a transition layer formed in the second stage; and
   (3) a polyacrylate formed in the third stage;
   wherein the transition layer is made of silane coupling agents, wherein the polysiloxane is prepared from monomers consisting of monomers selected from the group consisting of hexamethyl cyclotrisiloxane, octamethyl cyclotetrasiloxane, decamethyl cyclopentasiloxane, and combinations thereof.

2. The aqueous polymer dispersion according to claim 1, wherein the multistage emulsion polymer particle has a core/shell structure with the polysiloxane as core and the polyacrylate as shell.

3. The aqueous polymer dispersion according to claim 2, wherein the transition layer is positioned between the polysiloxane core and the polyacrylate shell.

4. The aqueous polymer dispersion according to claim 1, wherein the silane coupling agents are represented by formula (II):

$$R^3SiR^4_n(OR^5)_{3-n}, \qquad (II)$$

wherein:
n=0, 1, or 2;
$R^3$ is acryloyloxy $C_1$-$C_{20}$ alkyl, methacryloyloxy $C_1$-$C_{20}$ alkyl, vinyl, or allyl;
$R^4$, when present, is independently $C_1$-$C_{20}$ alkyl or aryl; and
$R^5$ is independently $C^1$—$C^{20}$ lkyl or aryl.

5. The aqueous polymer dispersion according to claim 4, wherein the silane coupling agents are selected from the group consisting of 3-methacryloyloxypropyl trimethoxysilane, 3-methacryloxypropylmethyldimethoxysilane, vinyltrimethoxysilane, methylvinyldiethoxysilane, and any combination thereof.

6. The aqueous polymer dispersion according to claim 1, wherein the polyacrylate is prepared from monomers represented by formula (III) and optionally monomers represented by CH2=Cle-Ph and CH2=CR$^8$—CN:

$$CH_2=CR^6-COOR^7 \qquad (III)$$

wherein:
$R^6$ is —H or $C_1$-$C_{20}$ alkyl,
$R^7$ is —H, $C_1$-$C_{20}$ alkyl, or hydroxy$C_1$-$C_{20}$ alkyl, and
$R^8$ is independently —H or —CH$_3$.

7. The aqueous polymer dispersion according to claim 1, wherein:
the transition layer is prepared from at least one silane coupling agent selected from the group consisting of 3-methacryloyloxypropyl trimethoxysilane, 3-methacryloxypropylmethyldimethoxysilane, vinyltrimethoxysilane, and methylvinyldiethoxysilane; and
the polyacrylate is prepared from at least one monomer selected from the group consisting of methyl methacrylate, methyl acrylate, ethyl acrylate, ethyl methacrylate, n-propyl acrylate, n-propyl methacrylate, n-butyl acrylate, n-butyl methacrylate, n-pentyl acrylate, n-pentyl methacrylate, n-hexyl acrylate, n-hexyl methacrylate, n-heptyl acrylate, n-heptyl methacrylate, n-octyl acrylate, n-octyl methacrylate, 2-hydroxyethyl acrylate, and 2-hydroxypropyl acrylate.

8. The aqueous polymer dispersion according to claim 1, wherein the multistage emulsion polymer particle has particle size of 50 to 1000 nm.

9. The aqueous polymer dispersion according to claim 1, wherein a mass ratio of the polysiloxane to the polyacrylate is 10:90-90:10.

10. The aqueous polymer dispersion according to claim 1, wherein the multistage emulsion polymer particle contains 10-90 wt % polysiloxane, 90-10 wt % polyacrylate and 0.1-30 wt % transition layer, the sum of percentage is 100 wt %.

11. The aqueous polymer dispersion according to claim 1, further comprising:
at least one additive selected from the group consisting of a pH modifier, a leveling agent, a bleacher, a complexing agent, a deodorant, an odorant, a viscosity modifier, a pigment, a surfactant, a thickener, a film-forming polymer, a wetting agent, a dispersant, a filler, a defoamer, a biocide, and a flow control agent.

12. The aqueous polymer dispersion according to claim 1, wherein a content of the multistage emulsion polymer particle ranges from 10 wt % to 55 wt %, based on a total weight of the aqueous polymer dispersion.

13. A coating composition, comprising:
(1) an aqueous polymer dispersion according to claim 1; and
(2) optionally at least one additive.

14. A method of preparing an aqueous polymer dispersion comprising a multistage emulsion polymer particle, said method comprising:
(1) preparing a polysiloxane in the first stage;
(2) preparing a transition layer on the polysiloxane in the second stage by reacting silane coupling agents at a temperature of 5° C. to 95° C.; and
(3) preparing a polyacrylate on the transition layer in the third stage;
wherein the polysiloxane is prepared from monomers consisting of a siloxane monomer selected from the group consisting of hexamethyl cyclotrisiloxane, octamethyl cyclotetrasiloxane, decamethyl cyclopentasiloxane, and combinations thereof.

15. The method according to claim 14, wherein the silane coupling agents are represented by formula (II):

$$R^3SiR^4_n(OR^5)_{3-n}, \qquad (II)$$

wherein:
n=0, 1, or 2;
$R^3$ is acryloyloxy $C_1$-$C_{20}$ alkyl, methacryloyloxy $C_1$-$C_{20}$ alkyl, vinyl or allyl;
$R^4$, when present, is independently $C_1$-$C_{20}$ alkyl or aryl; and
$R^5$ is independently $C_{1-20}$ alkyl or aryl.

16. The method according to claim 15, wherein the silane coupling agents are selected from the group consisting of 3-methacryloyloxypropyl trimethoxysilane, 3-methacryloxypropylmethyldimethoxysilane, vinyltrimethoxysilane, methylvinyldiethoxysilane, and any combination thereof.

17. The method according to claim 14, wherein the polyacrylate is prepared from monomers represented by formula (III) and optionally monomers represented by CH2=CR$^8$-Ph and CH2=CR$^8$—CN:

$$CH_2=CR^6-COOR^7 \qquad (III)$$

wherein:
$R^6$ is —H or $C_1$-$C_{20}$ alkyl,
$R^7$ is —H, $C_1$-$C_{20}$ alkyl or hydroxy $C_1$-$C_{20}$ alkyl, and
$R^8$ is independently —H or —CH$_3$.

18. The method according to claim 14, wherein:
the transition layer is prepared from at least one silane coupling agent selected from the group consisting of 3-methacryloyloxypropyl trimethoxysilane, 3-methacryloxypropylmethyldimethoxysilane, vinyltrimethoxysilane, and methylvinyldiethoxysilane; and
the polyacrylate is prepared from at least one monomer selected from the group consisting of methyl methacrylate, methyl acrylate, ethyl acrylate, ethyl methacrylate, n-propyl acrylate, n-propyl methacrylate, n-butyl acrylate, n-butyl methacrylate, n-pentyl acrylate, n-pentyl methacrylate, n-hexyl acrylate, n-hexyl methacrylate, n-heptyl acrylate, n-heptyl methacrylate, n-octyl acrylate, n-octyl methacrylate, 2-hydroxyethyl acrylate, and 2-hydroxypropyl acrylate.

* * * * *